(12) United States Patent
Lin et al.

(10) Patent No.: US 12,494,524 B2
(45) Date of Patent: Dec. 9, 2025

(54) BATTERY AND ELECTRICAL APPARATUS

(71) Applicant: CONTEMPORARY AMPEREX TECHNOLOGY (HONG KONG) LIMITED, Hong Kong (CN)

(72) Inventors: Zhuangzhuang Lin, Ningde (CN); Yangzhi Huang, Ningde (CN); Jinqing Ji, Ningde (CN); Jianhua Liu, Ningde (CN); Yongguang Wang, Ningde (CN); Yuanzhan Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 535 days.

(21) Appl. No.: 17/987,183

(22) Filed: Nov. 15, 2022

(65) Prior Publication Data
US 2023/0223612 A1    Jul. 13, 2023

Related U.S. Application Data

(63) Continuation of application No. PCT/CN2022/098299, filed on Jun. 13, 2022.

(30) Foreign Application Priority Data

Jan. 12, 2022  (CN) .......................... 202220075730.8

(51) Int. Cl.
*H01M 10/613*   (2014.01)
*B60L 50/64*    (2019.01)
(Continued)

(52) U.S. Cl.
CPC ........... *H01M 10/613* (2015.04); *B60L 50/64* (2019.02); *H01M 10/625* (2015.04);
(Continued)

(58) Field of Classification Search
CPC ............. H01M 10/613; H01M 10/625; H01M 10/643; H01M 10/653; H01M 10/6551;
(Continued)

(56) References Cited

U.S. PATENT DOCUMENTS 6,428,925 B1   8/2002  Takeno et al.
7,597,993 B2  10/2009  Glauning et al.
(Continued)

FOREIGN PATENT DOCUMENTS

CN    1267093 A   9/2000
CN  209217067 U   8/2019
(Continued)

OTHER PUBLICATIONS

Machine translation for CN 112038727 (cited on an IDS) (Year: 2020).*
(Continued)

*Primary Examiner* — Eugenia Wang
(74) *Attorney, Agent, or Firm* — Ladas & Parry LLP

(57) ABSTRACT

The present application provides a battery and an electrical apparatus with good heat dissipation performance. The battery includes: an air-cooling structure including a body and at least one air duct penetrating the body in a first direction; and a plurality of battery cells, wherein the plurality of battery cells are cylindrical, axes of the plurality of battery cells are parallel to the first direction, and the plurality of battery cells are arranged around the air-cooling structure; and the air-cooling structure is configured to discharge heat generated by the plurality of battery cells with air introduced into the air duct.

19 Claims, 6 Drawing Sheets

(51) Int. Cl.
*H01M 10/625* (2014.01)
*H01M 10/643* (2014.01)
*H01M 10/653* (2014.01)
*H01M 10/6551* (2014.01)
*H01M 10/6554* (2014.01)
*H01M 10/6562* (2014.01)
*H01M 10/6563* (2014.01)
*H01M 10/6566* (2014.01)
*H01M 50/213* (2021.01)
*H01M 50/262* (2021.01)

(52) U.S. Cl.
CPC ....... *H01M 10/643* (2015.04); *H01M 10/653* (2015.04); *H01M 10/6551* (2015.04); *H01M 10/6554* (2015.04); *H01M 10/6562* (2015.04); *H01M 10/6563* (2015.04); *H01M 10/6566* (2015.04); *H01M 50/213* (2021.01); *H01M 50/262* (2021.01); *H01M 2220/20* (2013.01)

(58) Field of Classification Search
CPC ......... H01M 10/6563; H01M 10/6566; H01M 10/6554; H01M 10/6556; H01M 10/6557; H01M 10/6562; H01M 50/213; H01M 50/262; H01M 50/24; H01M 50/249; H01M 50/271; H01M 50/289; B60L 50/64

See application file for complete search history.

(56) References Cited

U.S. PATENT DOCUMENTS

| | | | |
|---|---|---|---|
| 2015/0303531 | A1 | 10/2015 | Willgert et al. |
| 2019/0372169 | A1* | 12/2019 | Myers ................ H01M 10/654 |
| 2021/0091427 | A1 | 3/2021 | Wei |

FOREIGN PATENT DOCUMENTS

| | | |
|---|---|---|
| CN | 110504398 A | 11/2019 |
| CN | 111416179 A | 7/2020 |
| CN | 112038727 A | 12/2020 |
| CN | 216720070 U | 10/2022 |
| CN | 216720071 U | 10/2022 |
| JP | 2003045505 A | 2/2003 |
| KR | 100717781 B1 | 5/2007 |
| KR | 20210070105 A | 6/2021 |
| WO | 2009141348 A1 | 11/2009 |

OTHER PUBLICATIONS

ISR for International application No. PCT/CN2022/098299 mailed Oct. 14, 2022.
Written Opinion for International application No. PCT/CN2022/098299 mailed Oct. 14, 2022.
Decision to Grant a Patent, JP application No. 2022-567157, dated Jul. 8, 2024.
Extended European Search Report for EP application No. 22786260.4, dated Jun. 11, 2023.

* cited by examiner

BATTERY AND ELECTRICAL APPARATUS

CROSS REFERENCE TO RELATED APPLICATIONS

This application is a continuation of International Patent Application No. PCT/CN2022/098299, filed on Jun. 13, 2022, which claims priority to Chinese Patent Application No. 202220075730.8, filed on Jan. 12, 2022. The disclosures of these patent applications are incorporated by reference in their entirety.

TECHNICAL FIELD

The present application relates to the technical field of batteries, and in particular, to a battery and an electrical apparatus.

BACKGROUND

Due to the advantages of high energy density, recyclable charging, safety and environmental protection, power batteries are widely used in the fields of new energy vehicles, consumer electronics, energy storage systems and the like. However, the power batteries will generate heat during use, which will affect the performance of the power batteries and even cause serious safety problems. In order to ensure the normal use of the power batteries, it is necessary to dissipate heat for the power batteries.

SUMMARY

The present application provides a battery and an electrical apparatus with good heat dissipation performance.

In a first aspect, a battery is provided, including:
an air-cooling structure, comprising a body and at least one air duct penetrating the body in a first direction;
a plurality of battery cells, wherein the plurality of battery cells are cylindrical, axes of the plurality of battery cells are parallel to the first direction, and the plurality of battery cells are arranged around the air-cooling structure; and the air-cooling structure is configured to discharge heat generated by the plurality of battery cells with air introduced into the air duct.

Based on this technical solution, the plurality of cylindrical battery cells are arranged around the air-cooling structure, and the air-cooling structure includes a body and an air duct penetrating the body in an axial direction of the battery cells, air introduced into the air duct can take away heat generated by the plurality of battery cells, and good heat dissipation performance is achieved, so that the battery has high safety.

In a possible implementation, the plurality of battery cells are pasted on a first surface of the body away from the air duct by means of a thermally conductive structural adhesive.

The thermally conductive structural adhesive is used to realize the connection between the battery cells and the air-cooling structure. In addition, since the thermally conductive structural adhesive has good thermal conductivity, by pasting the plurality of battery cells on the first surface surrounding the air duct by means of the thermally conductive structural adhesive, it is beneficial to conduct the heat generated by the plurality of battery cells to the air duct, which further improves the heat dissipation efficiency.

In a possible implementation, a region on the first surface to which the plurality of battery cells are pasted has a contour shape matching that of surfaces of the plurality of battery cells. Therefore, the heat dissipation area of the plurality of battery cells is enlarged, and the heat dissipation efficiency is further improved.

In a possible implementation, a region on the first surface to which the plurality of battery cells are not pasted is provided with a weight-reducing groove.

The body of the air-cooling structure is usually made of a metal material such as an aluminum material, it has a relatively large weight, and the weight of the air-cooling structure can be reduced by providing the weight-reducing groove on a non-heat-dissipation region on the body that is not in contact with the battery cells.

In a possible implementation, the air-cooling structure further comprises a cover plate, wherein the cover plate is fixed to a first end of the body via first bolts, and the first end is the end where an air outlet of the air duct is located in the first direction.

To assemble the air-cooling structure and the plurality of battery cells within a case, it is possible to provide a cover plate at the end where an air outlet of the air-cooling structure is located, and to fix the cover plate to the body of the air-cooling structure via first bolts. This not only meets the assembly requirements, but can also enclose the plurality of battery cells by means of the cover plate.

In a possible implementation, a first sealing member is arranged between the cover plate and the first end.

Through the first sealing member, the sealing between the cover plate and the body may be realized at the air outlet, so that the battery cells are located in a closed space, and the air tightness requirement of the battery cells is ensured.

In a possible implementation, a gap exists between the cover plate and end faces of the plurality of battery cells.

The gap between the cover plate and the end faces of the battery cells can be adjusted according to assembly requirements, and the gap is configured to leave an enough space for the automatic assembly of the battery.

In a possible implementation, the battery further includes a box body, the box body comprising a first box body portion and a second box body portion, wherein the first box body portion and the second box body portion are snap-fitted with each other to form an accommodating cavity for accommodating the air-cooling structure and the plurality of battery cells, at least one of the first box body portion and the second box body portion has an opening, and a plane where the opening is located is parallel to the first direction.

The box body is arranged to be formed by snap-fitting the first box body portion with the second box body portion, which facilitates the assembly of the air-cooling structure and the plurality of battery cells in the box body.

In a possible implementation, a second sealing member is arranged between the cover plate and the box body.

Through the second sealing member, the sealing between the cover plate and the box body may be realized at the air outlet, so that the battery cells are located in a closed space, and the air tightness requirement of the battery cells is ensured.

In a possible implementation, a second end of the body is fixed to the box body via second bolts, and the second end is the end where an air inlet of the air duct is located in the first direction.

To assemble the air-cooling structure and the plurality of battery cells within a case, it is possible to fix the cover plate to the body of the air-cooling structure via second bolts. This not only meets the assembly requirements, but can also enclose the plurality of battery cells.

In a possible implementation, a third sealing member is arranged between the second end and the box body.

Through the third sealing member, the sealing between the box body and the air-cooling structure may be realized at the air inlets, so that the battery cells are located in a closed space, and the air tightness requirement of the battery cells is ensured.

In a possible implementation, a cross section of the air duct perpendicular to the first direction is in the shape of a fin.

The use of the fin-shaped air duct cross section shape can have both heat dissipation efficiency and process feasibility at the same time, which not only enlarges a heat exchange area between the air-cooling structure and the battery cells, but also ensures the process feasibility.

In a possible implementation, the air-cooling structure further includes a fan configured to introduce air into the air duct, so as to improve the heat dissipation efficiency of the battery cells.

In a second aspect, an electrical apparatus is provided, including the battery described in the first aspect or any possible implementation of the first aspect, wherein the battery is configured to supply electric energy to the electrical apparatus.

It can be seen that the plurality of cylindrical battery cells are arranged around the air-cooling structure, and the air-cooling structure includes a body and an air duct penetrating the body in an axial direction of the battery cells, air introduced into the air duct can take away heat generated by the plurality of battery cells, and good heat dissipation performance is achieved, so that the battery has high safety.

BRIEF DESCRIPTION OF DRAWINGS

In order to illustrate the technical solutions of the embodiments of the present application more clearly, the drawings required in the embodiments of the present application will be briefly introduced below. Obviously, the drawings described below are only some embodiments of the present application. For those of ordinary skill in the art, other drawings can also be obtained according to the drawings without any creative effort.

Figure 1:
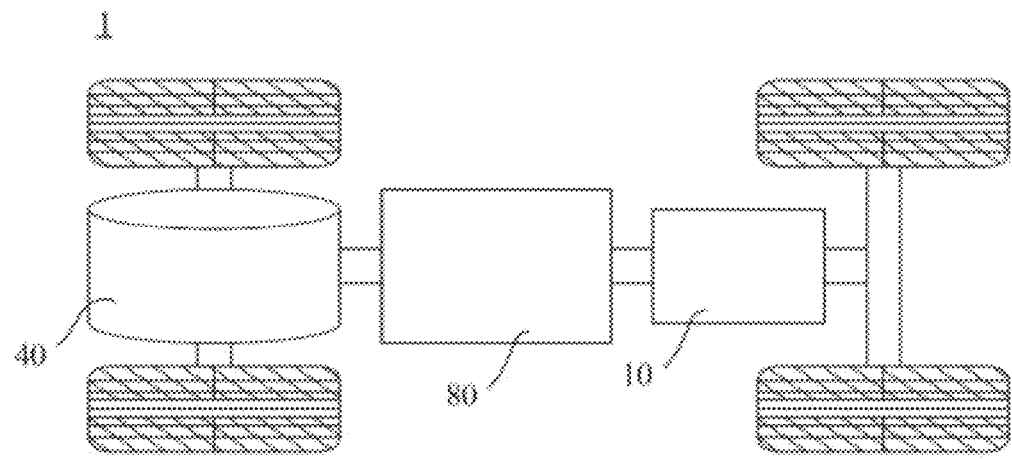
FIG. 1 is a schematic structural view of a vehicle to which an embodiment of the present application may be applied.

In the drawings, the drawings are not drawn to actual scale.

DETAILED DESCRIPTION

Implementations of the present application are described in further detail below in conjunction with the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Perpendicular" is not strictly perpendicular, but within the allowable range of errors. "Parallel" is not strictly parallel, but within the allowable range of errors.

Orientation words appearing in the following description are all directions shown in the drawings, and do not limit the specific structure of the present application. In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are comprised in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

In the present application, a battery cell may include a lithium-ion secondary battery, a lithium-ion primary battery, a lithium-sulfur battery, a sodium-lithium-ion battery, a sodium-ion battery, or a magnesium-ion battery, or the like. Generally, a battery cell may also be called a cell. The battery cell may be cylindrical, flat, rectangular, or in other regular or irregular shapes. The technical solutions of embodiments of the present application may be applied to battery cells in any shape, and in particular, are suitable for cylindrical battery cells and to dissipate heat for the cylindrical battery cells.

A battery mentioned in the present application refers to a single physical module that includes one or more battery cells to provide higher voltage and capacity. For example, the battery mentioned in the present application may include a battery module, a battery pack, or the like. The battery typically includes a box body for encapsulating one or more battery cells. The box body can prevent liquids or other foreign matters from affecting charging or discharging of the battery cells.

The battery cells include electrode assemblies and electrolyte solutions, and each electrode assembly is composed of a positive electrode sheet, a negative electrode sheet and a separator. The battery cells work mainly relying on the movement of metal ions between the positive electrode sheet and the negative electrode sheet. The positive electrode sheet includes a positive current collector and a positive electrode active material layer, a surface of the positive current collector is coated with the positive electrode active material layer, the positive current collector not coated with the positive electrode active material layer protrudes from the positive electrode collector already coated with the positive electrode active material layer, and the positive current collector not coated with the positive electrode active material layer is used as a positive electrode tab. Taking a lithium-ion battery as an example, the material of the positive current collector may be aluminum, and the positive active material may be lithium cobalt oxide, lithium iron phosphate, ternary lithium, lithium manganate, or the like. The negative electrode sheet includes a negative current collector and a negative electrode active material layer, a surface of the negative current collector is coated with the negative electrode active material layer, the negative current collector not coated with the negative electrode active material layer protrudes from the negative electrode collector already coated with the negative electrode active material layer, and the negative current collector not coated with the negative electrode active material layer is used as a negative electrode tab. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A material of the separator may be polypropylene (PP) or polyethylene (PE). In addition, the electrode assembly may be of a wound structure or a laminated structure, and the present application is not limited thereto.

In the box body of the battery, a signal transmission assembly may also be included. The signal transmission assembly is configured to transmit signals such as a voltage and/or a temperature of the battery cells. The signal transmission assembly may include a bus component, and the bus component is configured to realize electrical connection between the plurality of battery cells, such as parallel connection, series connection or series-parallel connection. The bus component may realize electrical connection between the battery cells by connecting electrode terminals of the battery cells. In some embodiments, the bus component may be fixed to the electrode terminals of the battery cells by welding. The bus component transmits the voltage of the battery cells, and a higher voltage will be obtained after the plurality of battery cells are connected in series. Correspondingly, the electrical connection formed by the bus component may also be called "high voltage connection".

In addition to the bus component, the signal transmission assembly may also include a sensing device for sensing the state of the battery cells, for example, the sensing device may be configured to measure and transmit sensing signals such as a temperature and a state of charge of the battery cells. In the present application, an electrical connection member within the battery may include the bus component and/or the sensing device.

The bus component and sensing device may be encapsulated in an insulating layer to form the signal transmission assembly. Accordingly, the signal transmission assembly may be configured to transmit a voltage and/or sensing signal of the battery cells. The signal transmission assembly has no insulating layer at junctions with the electrode terminals of the battery cells, i.e., the insulating layer has openings here to be connected with the electrode terminals of the battery cells.

The development of the battery technology needs to consider many design factors at the same time, such as energy density, cycle life, discharge capacity, charge-discharge rate and other performance parameters. In addition, the safety of the battery also needs to be considered.

Since a power battery will continuously generate heat during use, when the heat is too high, it may cause serious safety problems. In order to ensure the safety of the power battery, it is necessary to dissipate heat for the power battery.

In view of this, the present application provides a technical solution, by arranging an air-cooling structure and arranging a plurality of battery cells around the air-cooling structure, the heat of the battery cells can be effectively taken away by air introduced into an air duct, and good heat dissipation performance is achieved.

The technical solutions described in the present application are applicable to various electrical apparatuses using batteries, such as vehicles, mobile phones, portable devices, laptops, ships, spacecraft, electric toys, electric tools, and so on. The vehicle may be a fuel vehicle, a gas vehicle or a new energy vehicle. The new energy vehicle may be an all-electric vehicle, a hybrid electric vehicle, an extended-range electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers.

Hereinafter, for convenience of description, the electrical apparatus being a vehicle is taken as an example for description.

For example, as shown in FIG. 1, which is a schematic structural view of a vehicle 1 to which an embodiment of the present application may be applied, the vehicle 1 may be a fuel vehicle, a gas vehicle, or a new energy vehicle, and the new energy vehicle may be an all-electric vehicle, a hybrid vehicle, or an extended-range electric vehicle. A motor 40, a controller 80 and a battery 10 may be provided inside the vehicle 1, and the controller 80 is configured to control the battery 10 to supply power to the motor 40. For example, the battery 10 may be arranged at the bottom or the head or the tail of the vehicle 1. The battery 10 may be configured to supply power to the vehicle 1, for example, the battery 10 may be used as an operating power source of the vehicle 1, which is used for a circuit system of the vehicle 1, for example, for operation power requirements of the vehicle 1 during starting, navigation and running. In some embodiments, the battery 10 may not only be used as the operating power source of the vehicle 1, but also may be used as a driving power source of the vehicle 1 to provide driving power for the vehicle 1 in place of or partially in place of fuel or natural gas.

In order to meet different power usage requirements, the battery 10 may include a plurality of battery cells, for example, a plurality of cylindrical battery cells. The plurality of battery cells may be in series, parallel or series-parallel connection, and the series-parallel connection refers to a combination of series connection and parallel connection. The battery may also be called a battery pack. In some embodiments, the plurality of battery cells may be in series, parallel or series-parallel connection to form battery modules first, and then the plurality of battery modules may be in series, parallel or series-parallel connection to form the battery 10. That is to say, the plurality of battery cells may directly form a battery 10, or may form battery modules first, and then the battery modules form a battery 10.

Figure 2:
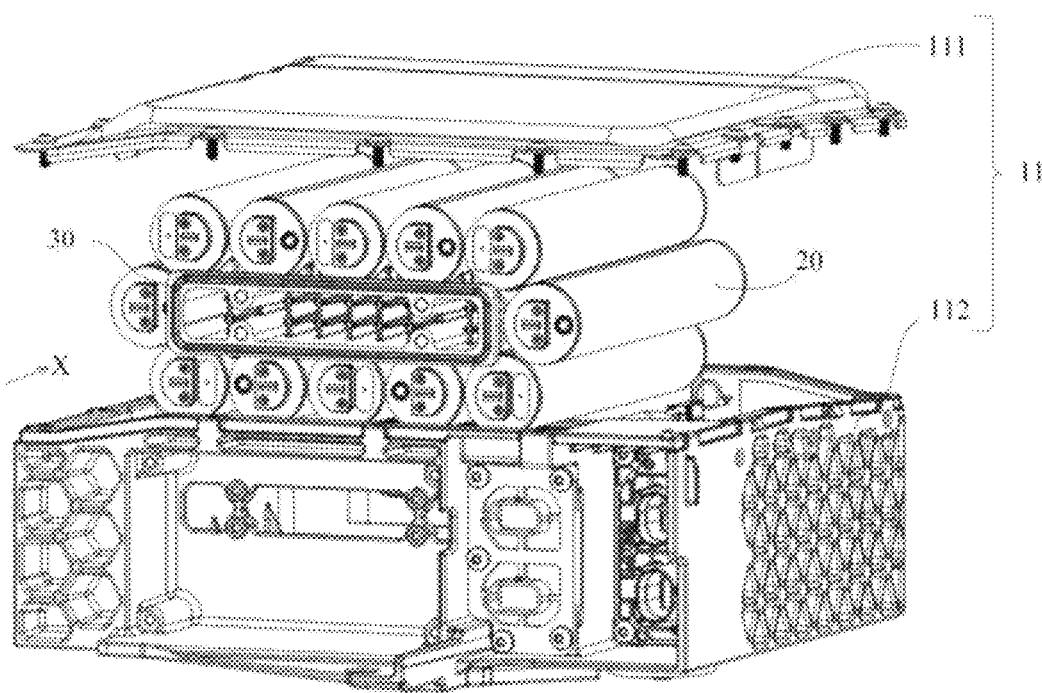
FIG. 2 is a schematic structural view of a battery according to an embodiment of the present application.

For example, as shown in FIG. 2, FIG. 2 is a schematic structural view of a battery 10 according to an embodiment of the present application. The battery 10 may include a plurality of battery cells 20. In addition to the battery cells 20, the battery 10 may further include a box body 11 (or a cover body), the interior of the box body 11 is of a hollow structure, and the plurality of battery cells 20 may be accommodated in the box body 11. As shown in FIG. 2, the box body 11 may include two parts, which are referred to as a first box body portion 111 and a second box body portion 112 respectively, and the first box body portion 111 and the second box body portion 112 are snap-fitted together. The shapes of the first box body portion 111 and the second box body portion 112 may be determined according to the combined shape of the plurality of battery cells 20, and at least one of the first box body portion 111 and the second box body portion 112 has an opening. For example, both the first box body portion 111 and the second box body portion 112 may be hollow rectangular solids and each has only one surface being an opening surface, the opening of the first box body portion 111 and the opening of the second box body portion 112 are disposed opposite to each other, and the first box body portion 111 and the second box body portion 112 are snap-fitted together to form the box body 11 having a closed cavity. For another example, only one of the first portion 111 and the second portion 112 may be a hollow rectangular solid with an opening, and the other may be in a plate shape to cover the opening. Depending on different power requirements, the number of battery cells 20 may be set to any value. The plurality of battery cells 20 may be in series, parallel or series-parallel connection to achieve a larger capacity or power. The plurality of battery cells 20 are assembled in parallel, in series or in series and parallel, and then placed in the box body 11 formed by snap-fitting the first box body portion 111 with the second box body portion 112 together.

In some embodiments, the battery 10 may also include other structures, which will not be repeated here. For example, the battery 10 may further include a bus component configured to realize electrical connection between the plurality of battery cells 20. Specifically, the bus component may realize electrical connection between the battery cells 20 by connecting electrode terminals of the battery cells 20. In some embodiments, the bus component may be fixed to the electrode terminals of the battery cells 20 by welding. Electric energy of the plurality of battery cells 20 may be further led out through an electrically conductive mechanism penetrating the box body. The electrically conductive mechanism may also belong to the bus component.

For convenience of description, the following description mainly takes the cylindrical battery cells 20 shown in FIG. 2 as an example.

Figure 3:
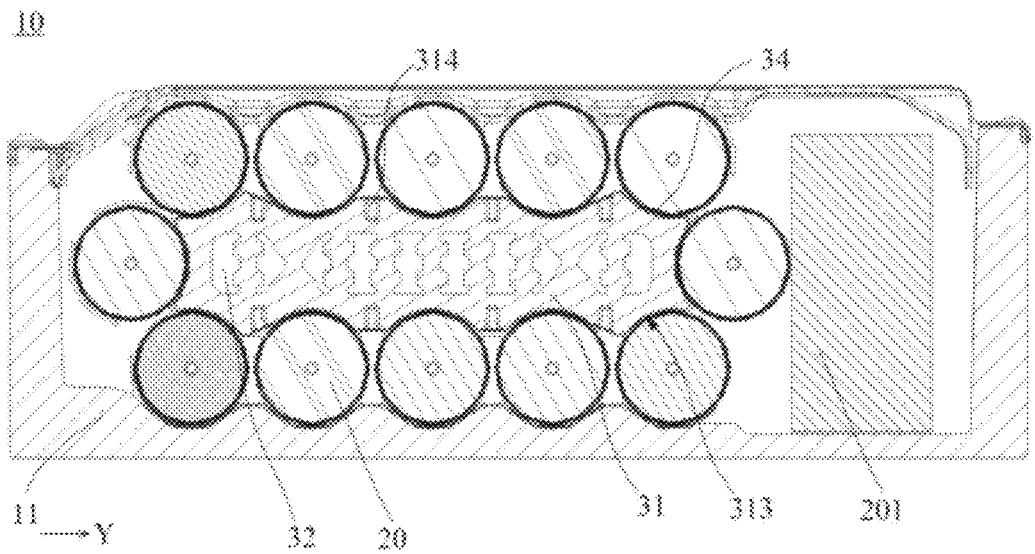
FIG. 3 is a schematic cross-sectional view of a battery according to an embodiment of the present application.

FIG. 3 is a schematic structural view of a battery 10 according to an embodiment of the present application. As shown in FIGS. 2 and 3, the battery 10 includes an air-cooling structure 30 and a plurality of battery cells 20.

The air-cooling structure 30 includes a body 31 and at least one air duct 32 penetrating the body 30 in a first direction X.

The plurality of battery cells 20 are cylindrical, axes of the plurality of battery cells 20 are parallel to the first direction X, and the plurality of battery cells 20 are arranged around the air-cooling structure 30. The air-cooling structure 30 is configured to discharge heat generated by the plurality of battery cells 20 with air introduced into the air duct 32.

The plurality of cylindrical battery cells 20 are arranged around the air-cooling structure 30, and the air-cooling structure 30 includes a body 31 and an air duct 32 penetrating the body 31 in an axial direction of the battery cells, i.e., in a first direction X, air introduced into the air duct 32 can take away heat generated by the plurality of battery cells 20, and good heat dissipation performance is achieved, so that the battery 10 has high safety.

FIG. 3 shows the position of a printed circuit board assembly (PCB) 201 of a battery management system (BMS) in the box body 11, and its specific structure is not shown in FIG. 3 for brevity and clarity.

In an implementation, as shown in FIGS. 2 and 3, the battery 10 further includes a box body 11, the box body 11 includes the first box body portion 111 and the second box body portion 112, the first box body portion 111 and the second box body portion 112 are snap-fitted with each other to form an accommodating cavity for accommodating the air-cooling structure 30 and the plurality of battery cells 20, at least one of the first box body portion 111 and the second box body portion 112 has an opening, and a plane where the opening is located is parallel to the first direction X. The box body 11 is arranged to be formed by snap-fitting the first box body portion 111 with the second box body portion 112, which facilitates the assembly of the air-cooling structure 30 and the plurality of battery cells 20 in the box body 11.

Since the plurality of battery cells 20 are accommodated in the accommodating space formed by snap-fitting the first box body portion 111 with the second box body portion 112, in an implementation, the first box body portion 111 and the second box body portion 112 may also be used for heat dissipation of the plurality of battery cells 20.

For example, a first heat dissipation portion 1110 is arranged on a bottom wall of the first box body portion 111, and a region on the first heat dissipation portion 1110 that is in contact with the plurality of battery cells 20 has a contour shape matching that of surfaces of the plurality of battery cells 20.

Figure 4:
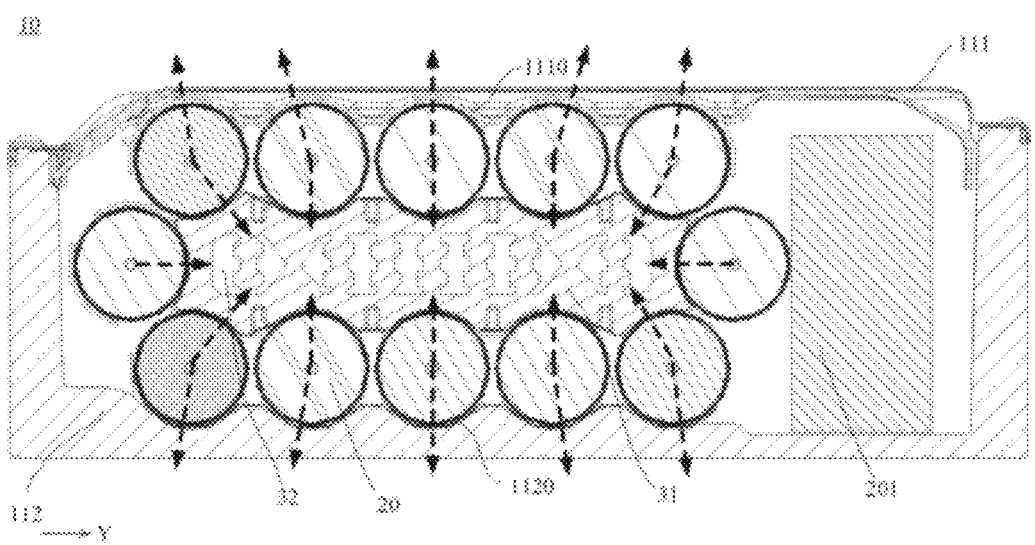
FIG. 4 is a schematic view of heat dissipation of a battery according to an embodiment of the present application.

The first heat dissipation portion 1110 is of a profiling design, and the region of the first heat dissipation portion that is in contact with the plurality of battery cells 20 has a contour shape designed to match that of the surfaces of the plurality of battery cells 20. The first heat dissipation portion 1110 may be a part of the bottom wall of the first box body portion 111, or may be a structure that is arranged on the bottom wall of the first box body portion 111 relatively independent from the first box body portion 111. As shown in FIG. 4, the first heat dissipation portion 1110 is a heat conducting plate arranged on the bottom wall of the first box body portion 111, a contour of a region on a surface of the heat conducting plate in contact with the plurality of battery cells 20 is in an arc shape, and a curvature of the arc is the same as curvatures of arcs at corresponding positions on the surfaces of the battery cells 20. In this way, the heat dissipation area of the battery cells 20 is enlarged. The black dashed arrows in FIG. 4 show the heat dissipation directions of the plurality of battery cells 20. Except the battery cells 20 located at both ends in the second direction Y, the heat dissipated by the other battery cells 20 can not only be taken away by the air introduced into the air duct 32, but also be taken away through the bottom wall of the first box body portion 111, which further improves the heat dissipation efficiency.

For another example, a second heat dissipation portion 1120 is arranged on a bottom wall of the second box body portion 112, and a region on the second heat dissipation portion 1120 that is in contact with the plurality of battery cells 20 has a contour shape matching that of the surfaces of the plurality of battery cells 20.

The second heat dissipation portion 1120 is of a profiling design, and a region of the second heat dissipation portion that is in contact with the plurality of battery cells 20 has a contour shape designed to match that of the surfaces of the plurality of battery cells 20. The second heat dissipation portion 1120 may be a part of the bottom wall of the second box body portion 112, or may be a structure that is arranged on the bottom wall of the second box body portion 112 relatively independent from the second box body portion 112. As shown in FIG. 4, the bottom wall of the second box body portion 112 is directed toward the surfaces of the battery cells 20 to serve as the second heat dissipation portion 1120. A contour of a region on the second heat dissipation portion 1120 in contact with the plurality of battery cells 20 is in an arc shape, and a curvature of the arc is the same as curvatures of arcs at corresponding positions on the surfaces of the battery cells 20, thus enlarging the heat dissipation area of the battery cells 20. The black dashed arrows in FIG. 4 show the heat dissipation directions of the plurality of battery cells 20. Except the battery cells 20 located at both ends in the second direction Y, the heat dissipated by the other battery cells 20 can not only be taken away by the air introduced into the air duct 32, but also be taken away through the bottom wall of the second box body portion 112, which further improves the heat dissipation efficiency.

As shown in FIGS. 3 and 4, when air is introduced into the air duct 32, the air may take away heat generated by the plurality of battery cells 20 surrounding the air-cooling structure 30. The shape of the cross section of the air duct 32 perpendicular to the first direction X is related to the heat dissipation efficiency of the battery cells 20. The larger the area of the cross section of the air duct 32, the higher the heat dissipation efficiency, but the more complicated a manufacturing process of the air duct 32. While ensuring the process feasibility, the cross section shape of the air duct 32 may be optimized by means of, for example, thermal simulation.

In an implementation, a cross section of the air duct 32 perpendicular to the first direction X is in the shape of a fin. For the air-cooling structure 30 formed by a die-casting process, the air duct 32 having a fin-shaped cross section shape can have both heat dissipation efficiency and process feasibility, which not only enlarges a heat exchange area, between the air-cooling structure 30 and the battery cells 20, but also has the feasibility of the die-casting process.

The present application does not limit the number and position of the air duct 32. In FIGS. 3 and 4, 10 air ducts 32 are used as an example, and the 10 air ducts are arranged in a second direction Y. The second direction Y is perpendicular to the first direction X. The cross section of each air duct 32 perpendicular to the first direction X is in the shape of a fin. For example, the fin shape may be a shape similar to the letter "E", see the leftmost three air ducts 32 and the rightmost three air ducts 32 in the 10 air ducts 32 arranged in the second direction Y in FIG. 3; and for another example, the fin shape may also be a shape similar to the Chinese character "王" formed by two opposite "E", see the middle four air ducts 32 in the 10 air ducts 32 arranged in the second direction in FIG. 3.

In an implementation, as shown in FIGS. 3 and 4, the plurality of battery cells 20 are pasted on a first surface 313 of the body 31 away from the air ducts 32 by means of a thermally conductive structural adhesive 34.

The thermally conductive structural adhesive 34 is used to realize the connection between the battery cells 20 and the air-cooling structure 30. In addition, since the thermally conductive structural adhesive 34 has good thermal conductivity, by pasting the plurality of battery cells 20 on the first surface 313 surrounding the air ducts 32 by means of the thermally conductive structural adhesive 34, it is beneficial to conducting the heat generated by the plurality of battery cells 20 to the air ducts 32, which further improves the heat dissipation efficiency.

In an implementation, a region on the first surface 313 of the body 31 to which the plurality of battery cells 20 are pasted has a contour shape matching that of the surfaces of the plurality of battery cells 20.

Figure 5:
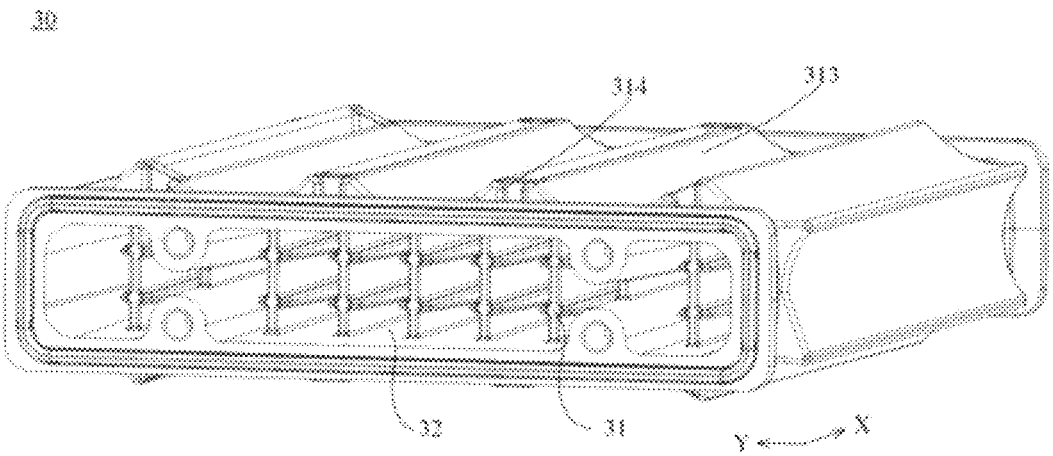
FIG. 5 is a schematic structural view of an air-cooling structure of a battery according to an embodiment of the present application.

For example, as shown in FIGS. 3 to 5, the contour of the region on the first surface 313 of the body 31 to which the plurality of battery cells 20 are pasted is in an arc shape, and a curvature of the arc is the same as curvatures of arcs at corresponding positions on the surfaces of the battery cells 20, so that the contact area between the battery cells 20 and the first surface 313 is enlarged, and the heat dissipation area of the plurality of battery cells 20 is enlarged, which further improves the heat dissipation efficiency.

In an implementation, as shown in FIGS. 3 to 5, a weight-reducing groove 314 is arranged on a region on the first surface 313 of the body 31 to which the plurality of battery cells 20 are not pasted.

Since the body 31 of the air-cooling structure 30 is usually made of metal materials such as aluminum materials, it has a relatively large weight, and the weight of the air-cooling structure 30 may be reduced by arranging the weight-reducing groove 314 on a non-heat-dissipation region on the body 31 not in contact with the battery cells 20. The present application does not limit the number and size of the weight-reducing groove 314, and 8 weight-reducing grooves are shown in FIGS. 3 to 5.

In an implementation, the air-cooling structure 30 further includes a cover plate 33. The cover plate 33 is fixed to a first end 311 of the body 32 via first bolts 41. The first end 311 is the end where air outlets of the air ducts 32 in the first direction X are located, and may also be referred to as a rear portion of the air-cooling structure 30.

Figure 6:
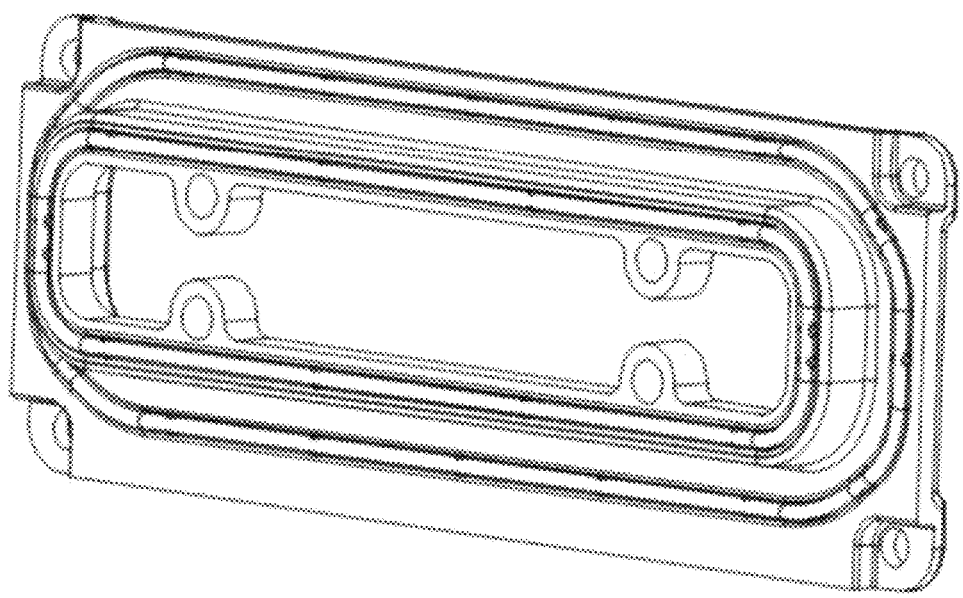
FIG. 6 is a schematic structural view of a cover plate of an air-cooling structure of a battery according to an embodiment of the present application.
Figure 7:
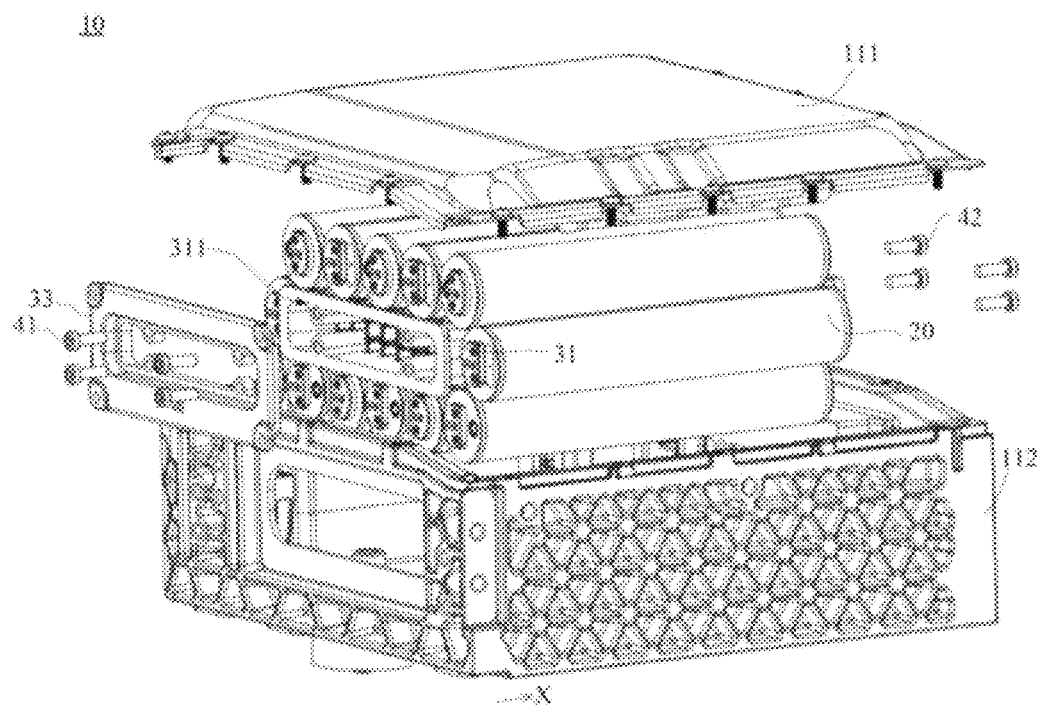
FIG. 7 is an exploded view of a battery according to an embodiment of the present application.
Figure 8:
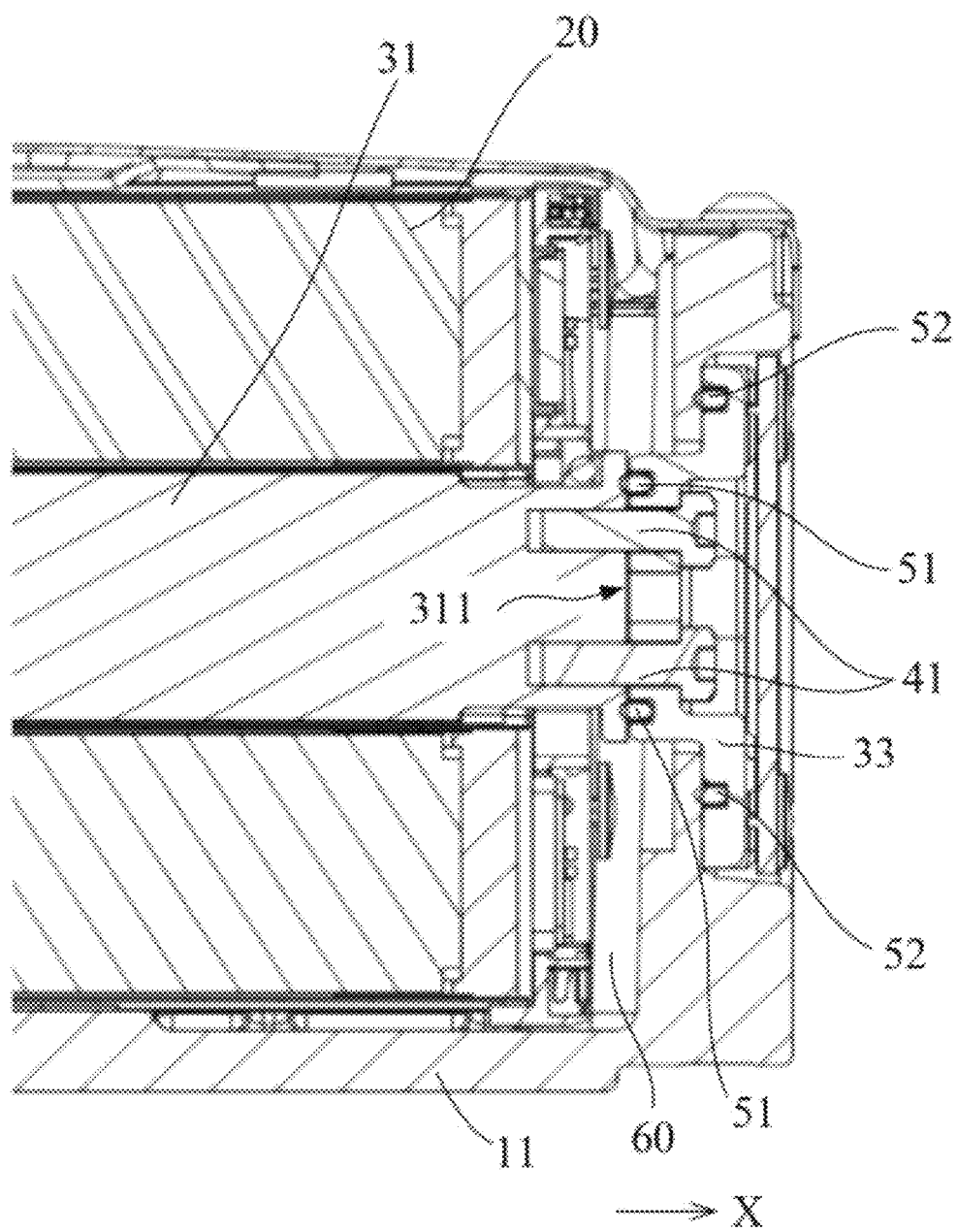
FIG. 8 is a schematic cross-sectional view of a battery an air outlet according to an embodiment of the present application.

FIG. 6 shows the structure of a cover plate 33 of an air-cooling structure 30. As shown in FIGS. 7 and 8, the air-cooling structure 30 and the plurality of battery cells 20 are accommodated in the box body 11, the cover plate 33 is arranged at the end where the air outlets of the air-cooling structure 10 are located, and the cover plate 33 and the body 31 of the air-cooling structure 30 are assembled together via the first bolts 41. After the air-cooling structure 30 and the plurality of battery cells 20 are connected by the thermally conductive structural adhesive 34 to form a module, the module may be put into the box body 11 from the opening of the second box body portion 112, and then the cover plate 33 is fixed to the first end 311 of the body 31 via the first bolts 41. This not only meets the assembly requirements of the battery 10 to realize the assembly of the air-cooling structure 30 and the plurality of battery cells 20 in the case 11, but can also enclose the plurality of battery cells 20 by means of the cover plate 33.

In an implementation, as shown in FIG. 8, a first sealing member 51 is arranged between the cover plate 33 and the first end 311 of the body 31. Through the first sealing member 51, the sealing between the cover plate 33 and the body 31 may be realized at the air outlets, so that the battery cells 20 are located in a closed space, and the air tightness requirement of the battery cells 20 is ensured.

In an implementation, as shown in FIG. 8, a second sealing member 52 is arranged between the cover plate 33 and the box body 11. Through the second sealing member 52, the sealing between the cover plate 33 and the box body 11 may be realized at the air outlets, so that the battery cells 20 are located in a closed space, and the air tightness requirement of the battery cells 20 is ensured.

It can be seen that, at the air outlets, the first sealing member 51 is configured to seal the cover plate 33 and the air-cooling structure 30, and the second sealing member 52 is configured to seal the cover plate 33 and the box body 11, so that after the plurality of battery cells 20 are arranged around the air-cooling structure 30, they can be located in the closed space formed by the case 11, the cover plate 33 and the air-cooling structure 30, so as to ensure the air tightness requirement of the battery cells 20.

In an implementation, as shown in FIG. 8, a gap 60 exists between the cover plate 33 and end faces of the plurality of battery cells 20. The gap 60 between the cover plate 33 and the end faces of the battery cells 20 can be designed according to assembly requirements, and the gap 60 is configured to leave an enough space for the automatic assembly of the battery 10.

In an implementation, a second end 312 of the body 32 of the air-cooling structure 30 is fixed to the box body 11 via second bolts 42. The second end 312 is the end where air inlets of the air ducts 32 in the first direction X are located, and may also be referred to as a front portion of the air-cooling structure.

Figure 9:
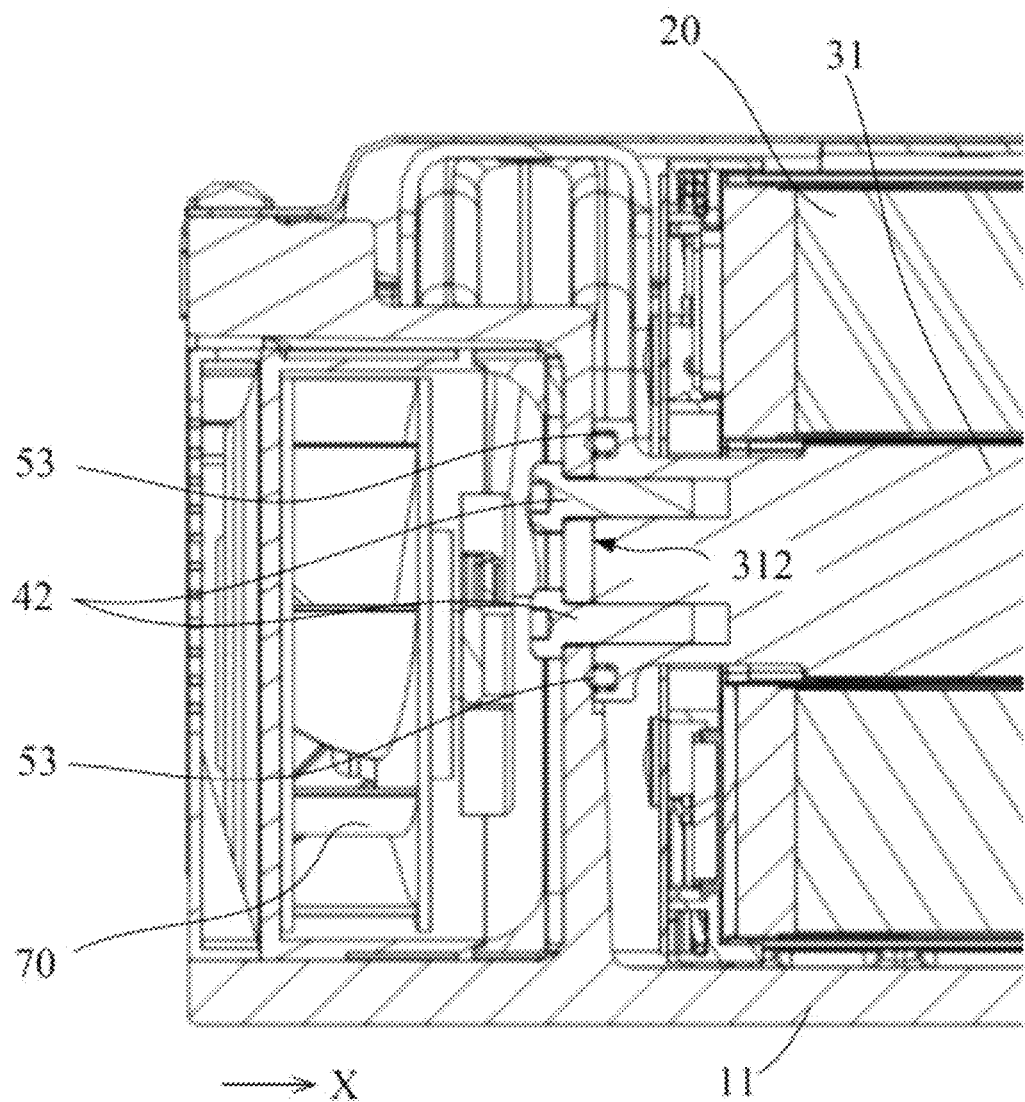
FIG. 9 is a schematic cross-sectional view of a battery at an air inlet according to an embodiment of the present application.

As shown in FIGS. 7 and 9, the air-cooling structure 30 and the plurality of battery cells 20 are accommodated in the box body 11, and the box body 11 and the body 31 of the air-cooling structure 30 are assembled together via the second bolts 42. After the air-cooling structure 30 and the plurality of battery cells 20 are connected to each other via the thermally conductive structural adhesive 34 to form a module, the module may be put into the box body 11 from the opening of the second box body portion 112, and then the second end 312 of the body 31 is fixed to the box body 11 via the second bolts 42. This not only meets the assembly requirements of the battery 10 to realize the assembly of the air-cooling structure 30 and the plurality of battery cells 20 in the case 11, but also seals the plurality of battery cells 20.

In an implementation, as shown in FIG. 9, a third sealing member 53 is arranged between the second end 312 of the body 31 and the box body 11. Through the third sealing member 53, the sealing between the box body 11 and the air-cooling structure 30 may be realized at the air inlets, so that the battery cells 20 are located in a closed space, and the air tightness requirement of the battery cells 20 is ensured.

In an implementation, the air-cooling structure 30 further includes a fan 70. The fan 70 is configured to introduce air into the air ducts 32, so as to improve the heat dissipation efficiency of the battery cells 20.

As shown in FIG. 9, the fan 70 is arranged at the air inlets. The fan 70 is, for example, an axial flow fan, which is configured to generate cold air in the first direction X. When the cold air passes through the air ducts 32, the heat generated by the battery cells 20 can be taken out from the inside of the battery 10 to lower the temperature of the battery 10.

An embodiment of the present application further provides an electrical apparatus. The electrical apparatus may include the battery 10 in the foregoing embodiments, for supplying electric energy to the electrical apparatus.

The battery 10 of the foregoing embodiments is arranged in the electrical apparatus. Since in the battery 10, a plurality of cylindrical battery cells 20 are arranged around an air-cooling structure 30, and the air-cooling structure 30 includes a body 31 and an air duct 32 penetrating the body 31 in an axial direction X of the battery cells 20, air introduced into the air ducts 32 can take away heat from the plurality of battery cells 10, and good heat dissipation performance is achieved, so that the battery 10 has high safety, and popularization and use of the electrical apparatus are facilitated.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:
1. A battery, comprising:
an air-cooling structure, comprising a body and at least one air duct penetrating the body in a first direction; and
a plurality of battery cells, wherein the plurality of battery cells are cylindrical, axes of the plurality of battery cells are parallel to the first direction, and the plurality of battery cells are arranged around the air-cooling structure, and the air-cooling structure is configured to discharge heat generated by the plurality of battery cells with air introduced into the air duct; and wherein the air-cooling structure further comprises a cover plate, the cover plate is fixed to a first end of the body via first bolts, and the first end is an end where an air outlet of the air duct is located in the first direction.

2. The battery according to claim 1, wherein the plurality of battery cells are pasted on a first surface of the body away from the air duct by means of a thermally conductive structural adhesive.

3. The battery according to claim 2, wherein a region on the first surface to which the plurality of battery cells are pasted has a contour shape matching that of surfaces of the plurality of battery cells.

4. The battery according to claim 2, wherein a region on the first surface to which the plurality of battery cells are not pasted is provided with a weight-reducing groove.

5. The battery according to claim 1, wherein a first sealing member is arranged between the cover plate and the first end.

6. The battery according to claim 1, wherein a gap exists between the cover plate and end faces of the plurality of battery cells.

7. The battery according to claim 1, wherein the battery further comprise a box body, the box body comprising a first box body portion and a second box body portion, wherein the first box body portion and the second box body portion are snap-fitted with each other to form an accommodating cavity for accommodating the air-cooling structure and the plurality of battery cells, at least one of the first box body portion and the second box body portion has an opening, and a plane where the opening is located is parallel to the first direction.

8. The battery according to claim 7, wherein a second sealing member is arranged between the cover plate and the box body.

9. The battery according to claim 7, wherein a second end of the body is fixed to the box body via second bolts, and the second end is the end where an air inlet of the air duct is located in the first direction.

10. The battery according to claim 9, wherein a third sealing member is arranged between the second end and the box body.

11. The battery according to claim 1, wherein a cross section of the air duct perpendicular to the first direction is in the shape of a fin.

12. The battery according to claim 1, wherein the air-cooling structure further comprises a fan, the fan being configured to introduce air into the air duct.

13. The battery according to claim 1, wherein the battery is one of the following:
    a lithium-ion secondary battery,
    a lithium-ion primary battery,
    a lithium-sulfur battery,
    a sodium-lithium-ion battery,
    a sodium-ion battery, or
    a magnesium-ion battery.

14. An electrical apparatus, comprising a battery for supplying electric energy to the electrical apparatus, wherein the battery comprises:
    an air-cooling structure, comprising a body and at least one air duct penetrating the body in a first direction; and
    a plurality of battery cells,
    wherein the plurality of battery cells are cylindrical, axes of the plurality of battery cells are parallel to the first direction, and the plurality of battery cells are arranged around the air-cooling structure, and the air-cooling structure is configured to discharge heat generated by the plurality of battery cells with air introduced into the air duct; and
    wherein the air-cooling structure further comprises a cover plate, the cover plate is fixed to a first end of the body via first bolts, and the first end is an end where an air outlet of the air duct is located in the first direction.

15. The electrical apparatus according to claim 14, wherein the plurality of battery cells are pasted on a first surface of the body away from the air duct by means of a thermally conductive structural adhesive.

16. The electrical apparatus according to claim 15, wherein a region on the first surface to which the plurality of battery cells are pasted has a contour shape matching that of surfaces of the plurality of battery cells.

17. The electrical apparatus according to claim 15, wherein a region on the first surface to which the plurality of battery cells are not pasted is provided with a weight-reducing groove.

18. The electrical apparatus according to claim 14, wherein the electrical apparatus is an electrical vehicle and the battery is configured to supply driving power to the vehicle.

19. The electrical apparatus according to claim 14, wherein the electrical apparatus is an electrical vehicle and the battery is an operating power source of the vehicle.

* * * * *